United States Patent [19]

Horst

[11] Patent Number: 4,618,956
[45] Date of Patent: Oct. 21, 1986

[54] METHOD OF OPERATING ENHANCED ALU TEST HARDWARE

[75] Inventor: Robert W. Horst, Cupertino, Calif.

[73] Assignee: Tandem Computers Incorporated, Cupertino, Calif.

[21] Appl. No.: 537,041

[22] Filed: Sep. 29, 1983

[51] Int. Cl.[4] ............................................. G06F 11/00
[52] U.S. Cl. ........................................ 371/68; 371/16; 324/73 AT
[58] Field of Search ................................ 371/3, 15–16, 371/67–68, 72; 324/73 R, 73 AT, 73 PC

[56] References Cited

U.S. PATENT DOCUMENTS

| | | | |
|---|---|---|---|
| 3,614,608 | 10/1971 | Giedd et al. | 324/73 R |
| 3,931,505 | 1/1976 | Sevcik | 371/68 X |
| 3,988,670 | 10/1976 | Gariazzo | 324/73 AT |
| 4,286,176 | 8/1981 | Oka et al. | 324/73 R X |
| 4,369,511 | 1/1983 | Kimura et al. | 324/73 R X |

OTHER PUBLICATIONS

DiPilato et al., "Error Detection in Registers where Parity Checking is Unavailable", *IBM Technical Disclosure Bulletin*, vol. 19, No. 3, Aug. 1976, p. 921.

Davis et al., "Auto-Test CPU Interface", *IBM Technical Disclosure Bulletin*, vol. 13, No. 11, Apr. 1971, pp. 3583–3584.

*Primary Examiner*—Gary V. Harkcom
*Attorney, Agent, or Firm*—Lyon & Lyon

[57] ABSTRACT

Method and hardware associated with an arithmetic logic unit (ALU) in a central processing unit of a data processor provides for testing the inputs to the ALU to see if logical AND is zero or the two inputs are equal while allowing the ALU to perform another function at the time these tests are made.

1 Claim, 3 Drawing Figures

METHOD OF OPERATING ENHANCED ALU TEST HARDWARE

FIELD OF THE INVENTION

The present invention relates to central processing units (CPUs) in data processing systems. More particularly, the invention relates to the arithmetic logic units (ALUs) contained within CPUs in data processing systems and conditions which may be tested for by software with respect to the data presented to ALUs.

BACKGROUND OF THE INVENTION

Among the many CPU functions in data processing systems are one or more tests which are performed on the data manipulated therein. The common denominator among the several tests which are performed on CPU data, particularly data associated with the ALU within the CPU is that such tests are performed upon the ALU "result". An ALU typically has two inputs to which operands are presensed and upon which the ALU performs one of several arithmetic or logical functions. The ALU "result" is the quantity which is presented at the output of the ALU as a result of the particular arithmetic or logical function which the ALU has been instructed by software to perform on the input operands.

The most typical test which is performed on the ALU result is the test ALU=0. This test examines the output of the ALU to determine whether in fact the ALU output is equal to zero. This test has assumed more than one form. In one commonly employed embodiment, the test allows masking of a subset of the bits forming one input to the ALU to ascertain whether a given bit field portion appearing on the other ALU input is equal to zero. To perform this test, a chosen portion of one input to the ALU is set with all logical "ones" while all other portions of the bit field of that input are "masked" or set to logical "zero".

In this manner, all of the bits of the other ALU input which correspond in bit position to the bits set to zero will, when logically ANDed to those bits, result in zero in that corresponding output bit position. Only those bits of the remaining unmasked bits (i.e., those bits not masked by a logical zero by the other ALU input) are effectively put to the test in the AND function, since they are logically combined with logical "ones". It is only if all of the "unmasked" bits are logical zero that the logical AND result out of the ALU will be equal to zero.

Another common use of this test is a loop counter routine wherein one input to the ALU is a value which is decremented in a subtract operation by the value placed on the other input to the ALU. After each decrement operation, the ALU result is tested to see if it is equal to zero. When the result is equal to zero, the loop counter routine is terminated.

These two aforementioned tests comprise the majority of tests which are performed on the ALU result in CPU operations involving the ALU.

While the performance of these tests has proven to be valuable to computer users for numerous reasons, there is an inherent characteristic of both tests which places a limitation on their utility. Both inputs to the ALU take a finite amount of time to propagate through the ALU in order to produce the result on which the test is performed. Furthermore, additional time is required for any borrow or carry operations which may affect the outcome of the tests.

There thus exists a need for a manner in which to perform these tests which does not involve the propagation time necessary to resolve the ALU inputs to an output result as an alternative to either stretching the clock cycle to permit the propagation of valuables through the ALU or by delaying the test by one clock cycle until the ALU results are available.

OBJECTS OF THE PRESENT INVENTION

It is therefore an object of the present invention to provide the CPU user with a set of tests which are, in most cases, the functional equivalent of the currently employed ALU result test but which do not require a time delay while the ALU performs its function and a further time delay while the test is performed on the ALU result.

A further object of the present invention is to provide testing for the equivalent of the results of an ALU operation which does not require the use of hardware on the output of an ALU.

Yet another object of the present invention is to provide testing for the equivalent of the results of an ALU operation which leaves the ALU free to perform a different operation on the same operands.

BRIEF DESCRIPTION OF THE INVENTION

Hardware is provided on the inputs to an ALU which allows one of two tests to be performed on the input data to the ALU. A comparator connected to both inputs of the ALU performs a bit-for-bit comparison of the values placed on the inputs to the ALU to determine if the value on input A is equal to the value on input B.

A microcode mask is placed on one of the inputs to the ALU and the entire contents of that input are ANDed with the entire contents of the other input on a bit-for-bit basis. The bit-for-bit results are presented to an NOR gate whose output indicates whether the one bus ANDed with the other bus gives a zero result.

DETAILED DESCRIPTION OF THE INVENTION

Figure 1:
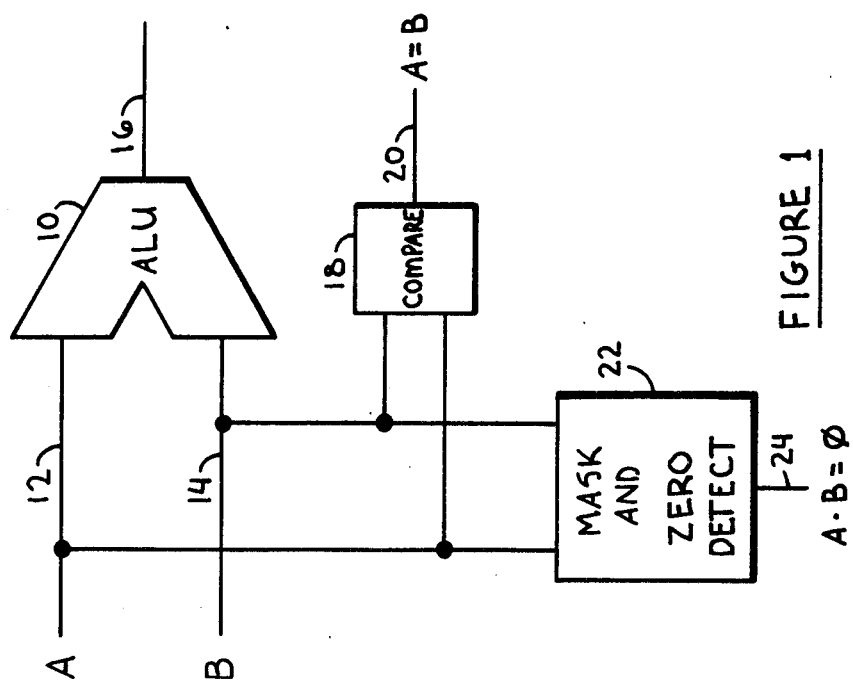
FIG. 1 is a block diagram of the hardware of a preferred embodiment of the present invention.

Referring first to FIG. 1, a block diagram of the preferred embodiment of the present invention is shown. Arithmethic logic unit (ALU) 10 is shown having two inputs, A input 12 and B input 14. ALU 10 also has output lines 16 on which the results of the arithmethic or logical operation performed on A and B are presented. It will be understood by those of ordinary skill in the art, that both inputs A and B and output 16 may comprise N lines, where N is the word size operated on by the processor.

A input 12 and B input 14 to the ALU are also connected as inputs to compare circuit 18. Compare circuit 18 performs a bit-by-bit comparison of the corresponding bits on input line A 12 and input line B 14. Compare circuit 18 delivers a logical one output on output line 20 if all the bits of A input 12 equal all the bits of B input 14.

Mask and zero detect unit 22 is also connected to A input 12 and B input 14 of ALU 10. The function of mask and zero detect unit 22 is to determine whether the contents of A input 12 and B input 14, when logically ANDed together, equal zero. Selective bit field masking may be performed on either all or part of the contents of either A input 12 or B input 14 by microcode as is known in the art. If the logical AND product of A input 12 and B input 14 is zero, a logic one will appear at the output 24 of mask and zero detect unit 22.

From FIG. 1, it can easily be seen that the time needed to perform either of the tests is less than the time needed to perform the zero test through the ALU 10. If the zero test is performed on the output 16 of ALU 10, the test may either have to be performed on the following clock cycle, or the present clock cycle may have to be stretched to allow the result to settle in the output of the ALU. This is most significant where the ALU=0 test is in the critical path of the CPU.

The two test conditions disclosed herein cover all major uses of the ALU result equal zero which they replace. For instance, in a loop counter routine, the running count is kept on one ALU input and a decrement value is placed on the other ALU input. The ALU subtraction is repeatedly performed after which the ALU result is tested for zero. With the present invention, the set up conditions are the same, that is, a running count is kept on one ALU and a decrementing value is kept on the other. However, with the present invention, the A=B test is performed on the A input 12 and B input 14 of ALU 10, and is the functional equivalent test for the end of the loop. The fact that the test results are available much earlier in the CPU cycle provides a significant advantage.

Another ALU output test which is replaced by the tests disclosed herein involves masking a subset of bits on one ALU input to determine if a choosen partial bit field of that input is equal to zero. In the prior art, a mask was placed on one ALU input and the data to be tested was placed on the other input, and the ALU was instructed to perform a logical AND operation. The ALU result was then tested to see if it equalled zero. With the present invention the same bits are masked on one ALU input and the zero detecting unit 22 performs the functional equivalent of this test on the ALU input, thus making the result available for use earlier in the CPU cycle.

Figure 2:
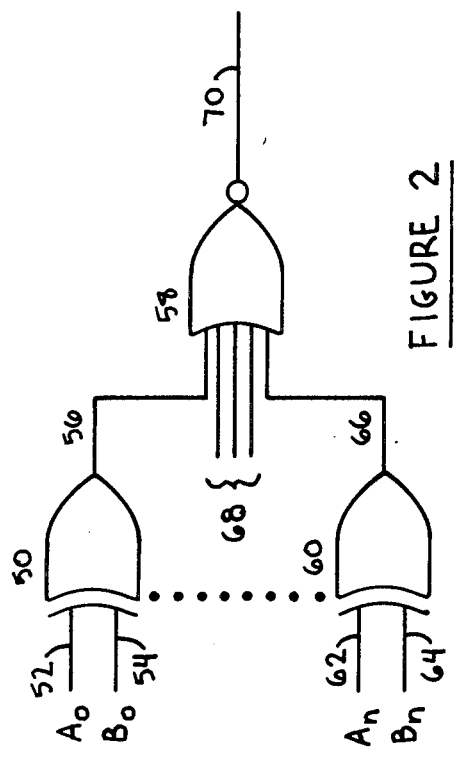
FIG. 2 is a logic level schematic diagram of hardware for implementing the preferred embodiment of the A=B test.

Referring now to FIG. 2, a logic level block diagram of preferred hardware for the A=B test is shown. Exclusive OR gate 50 has one of its inputs 52 connected to the least significant bit A0 of the A input 12 to ALU 10, and its other input 54 connected to the least significant bit of the B input 14 to ALU 10. Its output 56 is presented to NOR gate 58. Likewise, exclusive OR gate 60 has its one input 62 connected to the most significant bit of A input 12 of ALU 10 and its other input 64 connected to the most significant bit Bn of B input 14 to ALU 10. Its output 66 is likewise connected to an input of NOR gate 58. In like manner, the other corresponding bits of both A input 12 and B input 14 to ALU 10 are connected to exclusive OR gates (not shown) whose outputs are connected to other inputs to NOR gate 58. These inputs are shown generally at 68.

As can be seen from FIG. 2, it is only when each corresponding bit A and B are equal, that the outputs of exclusive OR gates 50 and 60 and other exclusive or gates will be zero, thus forcing the output of NOR gate 58 to assume a logic one state.

Figure 3:
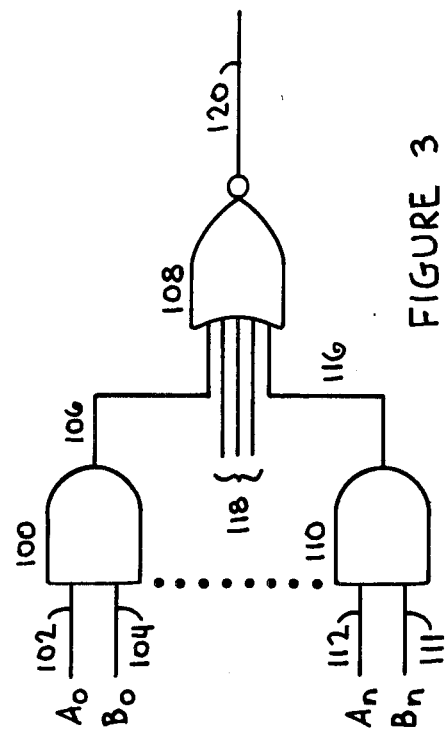
FIG. 3 is a logic level schematic diagram of hardware for implementing a preferred embodiment of the A AND B=0 test.

Referring now to FIG. 3, a logic level block diagram of preferred hardware necessary to perform the A AND B=0 test is shown. AND gate 100 has one of its inputs 102 connected to least significant bit A0 of A input 12 to ALU 10. Its other input 104 is connected to least significant bit B0 of B input 14 to ALU 12. The output of AND gate 100 at 106 is presented to NOR gate 108. Likewise, AND gate 110 has one of its inputs 112 connected to most significant bit An of A input 12 to ALU 10 its other input 114 connected to most significant bit Bn of B input 14 to ALU 10. The output 116 of AND gate 110 is also connected to an input of NOR gate 108. Likewise, corresponding A and B bits are presented to the inputs of other AND gates (not shown) whose outputs are also connected to the inputs of NOR gate 108. These inputs are shown generally at 118.

As is apparent from FIG. 3, output 120 of NOR gate 108 will only be at a logic one if all of its inputs are zero, i.e., if none of the AND gates 100 or 110, have both of their inputs at a logic one level.

Although a particular preferred embodiment of the invention has been disclosed, those skilled in the art will readily recognize that other logic elements could be easily configured to perform the functions disclosed herein. Furthermore, those skilled in the art will appreciate that the various elements described herein can be made from any logic family, e.g., TTL, ECL, CMOS, and the particular choice will be dictated by design considerations such as speed, density, and drive capability. Similar considerations will govern choices of individual logic elements, gate arrays, programmable array logic technology or the like.

I claim:

1. A method of operating a loop counter routine in a central processing unit of a digital computer, including the steps of:
  (a) providing a data input, representative of a first desired quantity, to a first input of an arithmetic logic unit,
  (b) providing a data input representing a second desired quantity to a second input of said arithmetic logic unit,
  (c) performing a subtract operation using said arithmetic logic unit during a first clock period,
  (d) performing an equivalence test on said first and second arithmetic logic unit inputs external to said arithmetic logic unit during said first clock period,
  (e) terminating said loop counter routine if the result of said equivalence test indicates that first and second arithmetic logic unit inputs are equal and returning the results of said arithmetic logic unit subtract operation to said first input of said arithmetic logic unit if the result of said equivalence test indicates that said first and second arithmetic logic unit inputs are not equal,
  (f) Repeating steps (b) through (e) until the result of said equivalence test indicates that said first and second arithmetic logic unit inputs are equal.

* * * * *